(12) United States Patent
Piazza et al.

(10) Patent No.: US 7,268,779 B2
(45) Date of Patent: Sep. 11, 2007

(54) Z-BUFFERING TECHNIQUES FOR GRAPHICS RENDERING

(75) Inventors: Thomas A. Piazza, Granite Bay, CA (US); Eric C. Samson, Folsom, CA (US)

(73) Assignee: Intel Corporation, Santa Clara, CA (US)

(*) Notice: Subject to any disclaimer, the term of this patent is extended or adjusted under 35 U.S.C. 154(b) by 174 days.

(21) Appl. No.: 10/329,202

(22) Filed: Dec. 24, 2002

(65) Prior Publication Data

US 2004/0119710 A1 Jun. 24, 2004

(51) Int. Cl.
*G06T 15/40* (2006.01)
(52) U.S. Cl. ..................... 345/422; 345/421
(58) Field of Classification Search ............... 345/422
See application file for complete search history.

(56) References Cited

U.S. PATENT DOCUMENTS

| | | | | |
|---|---|---|---|---|
| 5,619,627 A * | 4/1997 | Soderberg et al. | ........... | 345/421 |
| 5,923,333 A * | 7/1999 | Stroyan | ........... | 345/422 |
| 5,949,428 A * | 9/1999 | Toelle et al. | ........... | 345/589 |
| 6,038,031 A * | 3/2000 | Murphy | ........... | 382/254 |
| 6,154,223 A * | 11/2000 | Baldwin | ........... | 345/506 |
| 6,166,743 A | 12/2000 | Tanaka | | |
| 6,239,809 B1 * | 5/2001 | Morioka et al. | ........... | 345/422 |
| 6,342,882 B1 * | 1/2002 | Oka | ........... | 345/419 |
| 6,380,935 B1 * | 4/2002 | Heeschen et al. | ........... | 345/423 |
| 6,404,425 B1 | 6/2002 | Cosman | | |
| 6,411,294 B1 * | 6/2002 | Furuhashi et al. | ........... | 345/421 |
| 6,411,295 B1 | 6/2002 | Hung et al. | | |
| 6,414,680 B1 | 7/2002 | Klosowski et al. | | |
| 6,448,967 B1 | 9/2002 | Hsiao | | |
| 6,559,852 B1 * | 5/2003 | Ashburn et al. | ........... | 345/533 |
| 6,636,212 B1 * | 10/2003 | Zhu | ........... | 345/421 |
| 6,636,214 B1 * | 10/2003 | Leather et al. | ........... | 345/422 |
| 6,670,955 B1 * | 12/2003 | Morein | ........... | 345/421 |
| 6,700,584 B1 * | 3/2004 | Wood | ........... | 345/581 |
| 6,720,964 B1 * | 4/2004 | Fowler et al. | ........... | 345/422 |
| 6,760,025 B1 * | 7/2004 | Hung et al. | ........... | 345/422 |
| 6,791,558 B2 * | 9/2004 | Park et al. | ........... | 345/556 |
| 6,812,927 B1 * | 11/2004 | Cutler et al. | ........... | 345/506 |

FOREIGN PATENT DOCUMENTS

GB 2352381 A 1/2001

* cited by examiner

*Primary Examiner*—Ulka J. Chauhan
*Assistant Examiner*—Roberta Prendergast
(74) *Attorney, Agent, or Firm*—Blakely, Sokoloff, Taylor & Zafman LLP (57) ABSTRACT

Embodiments of the invention relate to graphics rendering in which Z-buffering tests are performed at the front of the rendering pipeline. Particularly, Z-buffering test logic at the front of the rendering pipeline is coupled to a render cache memory, which includes a Z-buffer, such that Z-buffering can be accomplished at the front of the rendering pipeline.

28 Claims, 4 Drawing Sheets

Z-BUFFERING TECHNIQUES FOR GRAPHICS RENDERING

BACKGROUND

1. Field

Embodiments of the invention relate to the field of Z-buffering. More particularly, embodiments of the invention relate to techniques for improved Z-buffering for graphics rendering in the creation of 3-D graphics.

2. Description of Related Art

Computer graphics systems are frequently used to model a scene having three-dimensional (3-D) objects and then to display them on a two-dimensional display device such as a cathode ray tube. One such system in common use is a polygon-based, object-order graphics system in which 3-D objects in a scene are each represented by a multitude of polygons (or primitives) that approximate the shapes thereof. Depending upon the orientation selected for viewing the scene in two dimensions, many of the primitives representing objects in the scene will be hidden behind other primitives and thus not displayed. Primitives not completely hidden are termed visible and will be displayed, either in full or in part depending upon whether a portion of a given primitive is hidden, in the rendered image on the display device. As the depth complexity (i.e. the number of levels of primitives hidden behind one another) of a scene to be rendered increases, the percentage of all primitives representing the scene that will ultimately be visible by an observer on the display device decreases significantly. Thus, in many cases, most of the primitives for a scene will be hidden.

Conventional computer graphics systems typically have a frame buffer and a Z-buffer. The frame buffer is typically a memory (e.g. Dynamic Random Access Memory (DRAM) or Synchronous Random Access Memory (SRAM)) which holds the digital representation of the color and intensity for each pixel in the image. The frame buffer is also referred to as a video bitmap. The Z-buffer (also referred to as a depth buffer) is a large array of memory with an entry for each pixel in the frame buffer.

One method for determining which primitives will be visible or hidden involves the use of the Z-buffer, and is often termed Z-buffering. The Z-axis in a graphics system reflects the distance from a specific observer's viewpoint. Thus, a larger Z-value represents a greater distance from the viewpoint. Z-buffering involves the comparison of Z-values of points on generated objects to determine which object is closest to the viewpoint and therefore should appear on the two-dimensional display. As a part of processing the graphical data for a scene, pixels are generated for each of the primitives in the scene.

In conventional Z-buffer systems, as each pixel is generated, its Z coordinate (Znew) is compared with the Z coordinate previously stored in the Z-buffer (Zold). Before processing the first primitive for a scene, the Z-buffer is initialized by storing the value corresponding to a maximum distance (Zmax) in the Z-buffer entry for every pixel so that initially Zold corresponds to Zmax. In general, if Znew is less than Zold (indicating that this pixel is closer to the viewpoint than the previous viewpoint), then the pixel is written to the display device and the Z-buffer memory is updated to contain Znew. If Znew is greater than or equal to Zold, then the pixel is not written and the Z-buffer remains unchanged. All of the pixels for a primitive that is completely hidden will ultimately be overwritten in the Z-buffer during this process so that the primitive is not displayed.

In computer graphics, "rendering" is the process of translating a set of data into a picture that can be displayed. In the rendering process, a picture database typically holding polygon data is read, and calculations are performed by the rendering hardware, pixel by pixel, to decide the color of each pixel. A color calculator often performs this functionality. When a polygon is rendered, a color sample is obtained for each pixel that the polygon covers. If over-sampling is carried out, each pixel will have multiple corresponding color samples that are averaged to give the final color of the pixel. Each color sample has an associated Z-value and a location. The Z-buffer stores the smallest Z-value so far encountered for each location. If a color sample has a Z-value smaller than the value for that location as recorded in the Z-buffer, that sample is written into the frame buffer and the Z-buffer is updated. Otherwise, the color sample is discarded.

The Z-buffering process, the color determination of each pixel, as well as many other functions associated with 3-D graphics, such as utilizing different textures that may include different shadings, holes, transparent textures, translucent textures, etc., is typically performed by a rendering engine of a graphics processor. The rendering engine performs these functions utilizing a rendering pipeline. Graphics data flows along a rendering path through the rendering pipeline. Typically, Z-buffering is not performed until the very end of the rendering pipeline. Unfortunately, a major disadvantage of utilizing the conventional Z-buffering process with current rendering pipeline architectures is that it is inefficient in terms of memory usage.

DESCRIPTION

Figure 1:
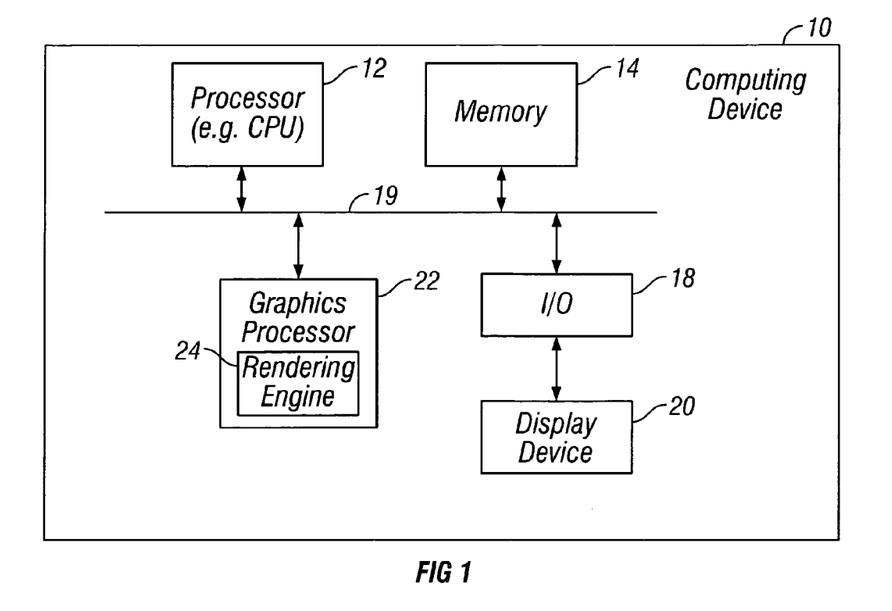
FIG. 1 shows a block diagram of an exemplary computing device in which embodiments of the invention for improved Z-buffering processing may be implemented.

In the following description, the various embodiments of the present invention will be described in detail. However, such details are included to facilitate understanding of the invention and to describe exemplary embodiments for employing the invention. Such details should not be used to limit the invention to the particular embodiments described because other variations and embodiments are possible while staying within the scope of the invention. Furthermore, although numerous details are set forth in order to provide a thorough understanding of the present invention, it will be apparent to one skilled in the art that these specific details are not required in order to practice the present invention. In other instances details such as, well-known methods, types of data, protocols, procedures, components, electrical structures and circuits, are not described in detail, or are shown in block diagram form, in order not to obscure embodiments of the present invention. Furthermore, aspects of the invention will be described in particular embodiments but may be implemented in hardware, software, firmware, middleware, or a combination thereof With reference to FIG. 1, FIG. 1 shows a block diagram of an exemplary computing device 10 in which embodiments of the invention for improved Z-buffering processing may be implemented. As shown in FIG. 1, a processor 12 (e.g. a central processing unit (CPU)) is coupled to a memory 14, a graphics processor 22 and an input/output (I/O) interface 18, through bus 19. One of the devices attached to the I/O interface 18 may be a display device 20 upon which graphics may be rendered. The graphics processor 22 may be utilized to perform graphics processing for the processor 12 in order to reduce the workload on the processor 12. Moreover, the graphics processor 22 may include a rendering engine 24 having a rendering pipeline in which embodiments of the invention for improved Z-buffering processing may be implemented. It should be appreciated that the computing device 10 is only exemplary and that any type of computing device that renders graphics may be utilized in implementing aspects of the invention.

Figure 2A:
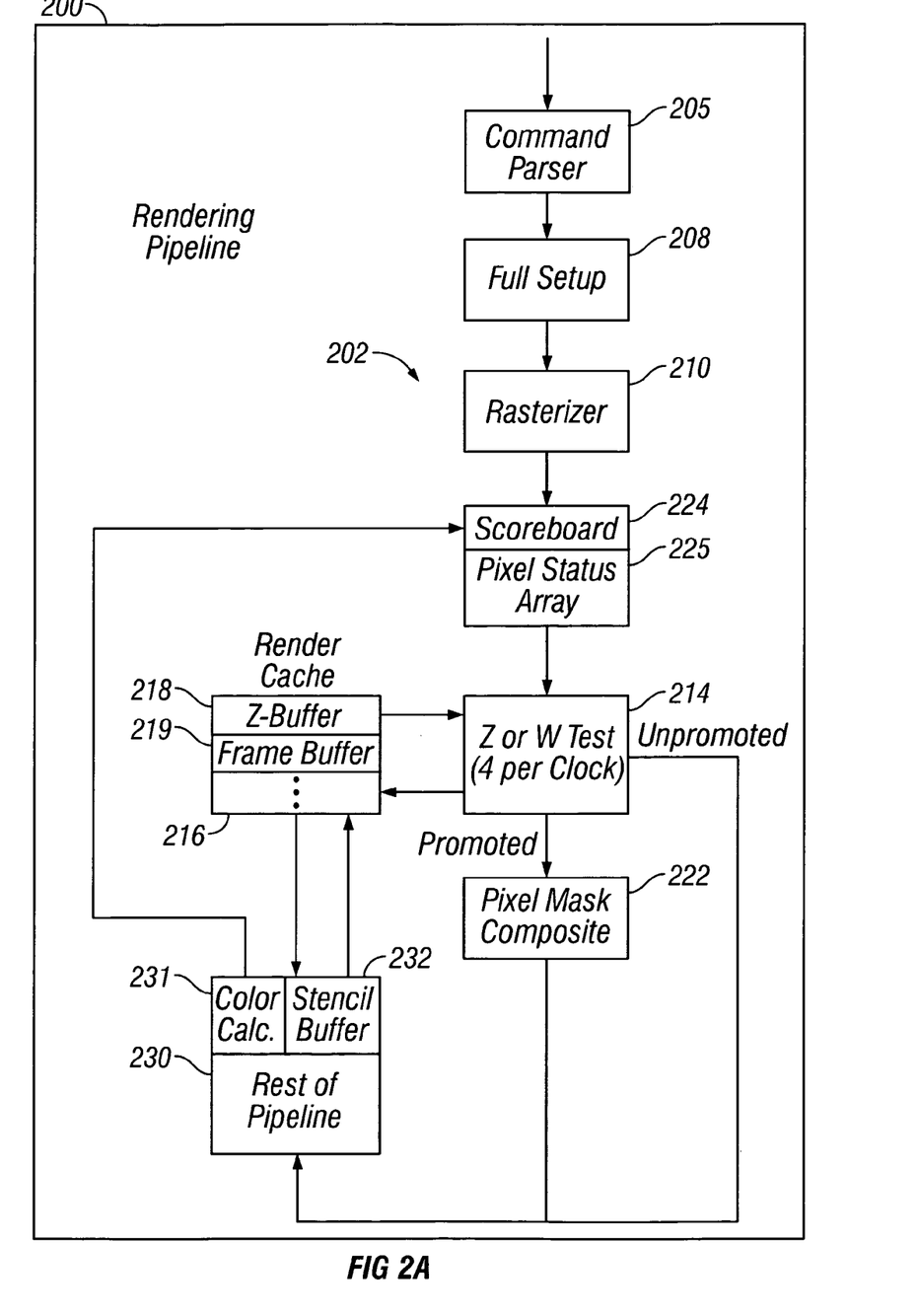
FIG. 2A shows an improved Z-buffering process implemented in a rendering pipeline to perform 3-D graphics rendering, according to one embodiment of the present invention.

Turning now to FIG. 2A, FIG. 2A shows an improved Z-buffering process 200 implemented in a rendering pipeline 202 to perform 3-D graphics rendering, according to one embodiment of the present invention. As shown in FIG. 2A, the improved Z-buffering process or function 200 begins with command parsing at command parser logic block 205. Typically, somewhere in the computing device, such as in the CPU, a workload having commands, pointers, data, etc., for the graphics image to be rendered by the rendering pipeline 202 is created. This workload usually includes the mode of graphics operation (e.g. 3-D mode) to be performed by the rendering pipeline 202. Further, the workload typically includes the coordinates for the image to be displayed, which is a usually a polygon, such as a triangle having three X-Y-Z coordinates. Also, the workload usually includes what type of texture is to be applied by the rendering pipeline 202 to the image (e.g. shading, holes, transparent textures, translucent textures, etc.). The command parser logic block 205 parses the workload (e.g. the command, pointers, data, coordinates, etc.) for the rendering pipeline 202.

Next, the full setup logic block 208 takes the parsed data from the command parser logic block 205 and translates it into a common format for use by the rendering pipeline 202. Particularly, the full setup logic block 208 takes the raw vertice information (e.g. the three X-Y-Z coordinates for the triangle) and translates the raw vertice information into data that the rendering pipeline 202 can utilize to render the triangle. For example, this includes performing edge calculations for the triangle and Z setup and W setup calculations. Also, the full setup logic block 208 can additionally perform other setup calculations and functions such as for colors, textures, text, etc., related to the triangle. It should be appreciated that the aspects of the present invention will be described with reference to performing Z setups and tests, however, the invention is just as easily applicable to performing W setups and tests. W setups and tests are usually mathematically denoted as being scaled normalized forms of Z setups and tests.

Figure 2B:
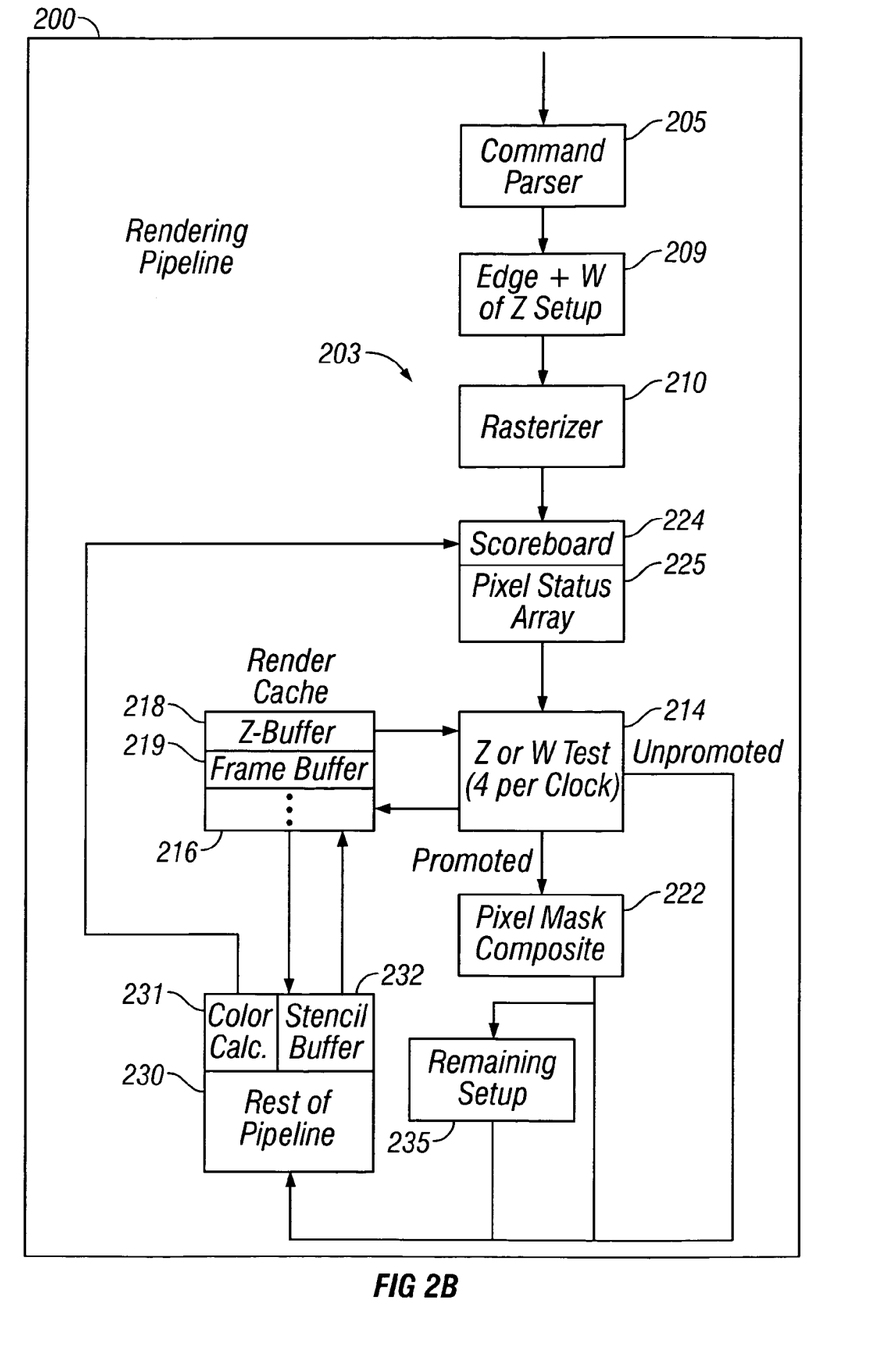
FIG. 2B shows a slightly modified version of the improved Z-buffering process of FIG. 2A, in which instead of performing a full setup, only edge calculations for the triangle and Z or W setup calculations are performed, according to one embodiment of the present invention.

Turning briefly to FIG. 2B, FIG. 2B shows a slightly modified improved Z-buffering process 200 implemented in the rendering pipeline 203 to perform 3-D graphics rendering, according to one embodiment of the present invention, in which instead of performing a full setup, only edge calculations for the triangle and the Z or W setup calculations are performed (block 209). Other setup functionality, such as for colors, textures, text, etc., related to the triangle, may be performed in a remaining setup logic block 235 later in the rendering pipeline 203. This example of the rendering pipeline is only a slight modification that in some aspects improves the efficiency of the rendering pipeline; but in all other respects, the rendering pipeline of FIG. 2B is the same as FIG. 2A.

Returning to FIG. 2A, the next function in the rendering pipeline 202 is the Rasterizer logic block 210. The Rasterizer logic block 210 basically identifies what pixels are to be included inside of the polygon (e.g. triangle) being processed. Also, although, the improved Z-buffering process 200 will be discussed in terms of Z calculations, either Z or W calculations can be utilized dependent on the mode of operation.

Figure 3:
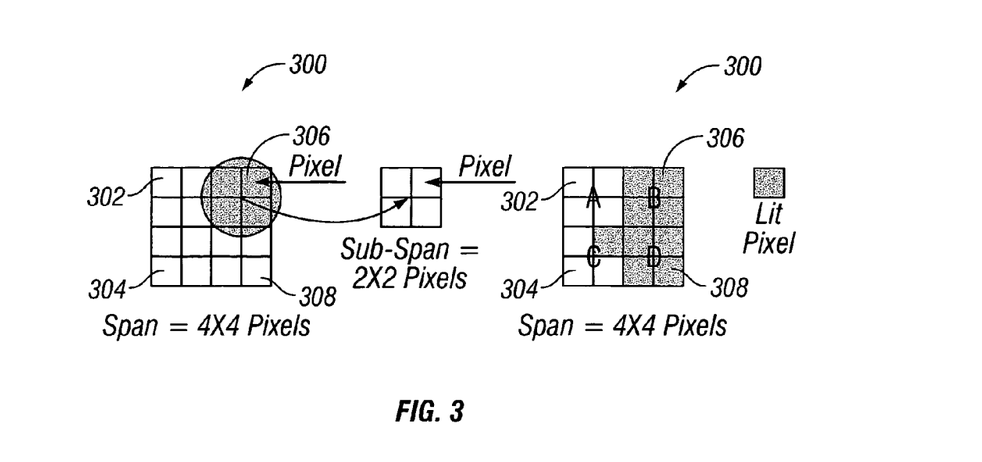
FIG. 3 shows an example of a 4×4 pixel mask, according to one embodiment of the present invention.

In one example, the improved Z-buffering (hereinafter IZ) process or function 200, runs at four pixels per clock, sub-span aligned. The IZ function 200 follows the Rasterizer function commonly used in 3D graphics rendering. Although the following example utilizes a 4×4 pixel mask, this is only for explanatory purposes and it should be appreciated that any suitably sized pixel mask could be utilized (e.g. 1×1, 2×2, 8×8, . . . etc.) Turning now to FIG. 3, which shows a 4×4 pixel mask according to one embodiment of the present invention, the IZ function 200 receives the 4×4 pixel mask 300 from the Rasterizer function. The 4×4 pixel mask 300 is divided into four quadrants, herein called a sub-span, which is equal to a 2×2 pixel array. FIG. 3 shows that 4×4 pixel mask 300 includes four sub-spans 302, 304, 306, and 308, each having four pixels, respectively.

If no pixels are set in a particular sub-span they are skipped over by the improved Z-buffering process or function 200. On the other hand, if any of the pixels are set within a sub-span the IZ process 200 will compute the 4 Z-values for that sub-span. In the case shown in FIG. 3, the IZ process will compute the 4 Z-values for sub-spans B, C, D, and skip over sub-span A. In one example, for simplicity of implementation the IZ function, computes 4 values per sub-span even though for sub-span C 304 only one of the Z-values will be used. Thus, for the above case 12 Z-values are computed but only 9 are used.

Returning to FIG. 2A, a scoreboard memory 224 having a pixel status array 225 may be utilized to track unpromoted pixels that are in the pipeline, as will be discussed in more detail later. One particular example of a class of unpromotable pixels, as will be discussed in detail later, is what is termed "cheese" wherein a pixel has a texture (e.g. holes, transparent textures, translucent textures, etc.) associated with it.

The render cache 216 is logically located in the back of the render pipeline 202, however, according to embodiments of the present invention it is also directly coupled to the Z-test logic block 214 to implement the IZ function 200. Further, the render cache includes a Z-buffer 218 and a frame buffer 219. The rest of the rendering pipeline 230 suitably processes pixels for graphics rendering as is known in the art. Further, as is done conventionally, the rest of the pipeline 230 may also perform Z-buffering tests at the back of the pipeline.

In one embodiment of the invention, the rendering pipeline 202 performs Z-buffering tests at the front of the rendering pipeline, which improves the efficiency of the rendering pipeline. Particularly, Z-buffering test logic 214 of the rendering pipeline 202 is directly coupled to the render cache memory 216 at the back of the pipeline, which includes the Z-buffer 218 and the frame buffer 219, such that Z-buffering (i.e. performing the Z-test) can be accomplished at the front of the rendering pipeline for a majority of pixels. Thus, a pixel of the current polygon (e.g. a triangle) of the bin currently being processed can undergo the Z-test by the Z-buffering test logic 214 at the front of the rendering pipeline 202.

However, the Z-buffering test logic 214 at the front of the rendering pipeline 202 can only deteminatively perform the Z-test for "promotable" pixels and not for "unpromotable" pixels. The terms promotable pixel and unpromotable pixel will now be defined, as follows.

A promotable pixel is a pixel that is part of a polygon (e.g. a triangle) that the IZ process 200 deterministically knows will survive through the rest of the pipeline 230 if the Z-buffering test logic 214 at the front of the rendering pipeline 202 determines that it passes the Z-test and/or the stencil test. In other words, no other processing needs to be done to determine if the promotable pixel needs to be discarded after it has passed the Z-test of the Z-test logic 214 at the front of the rendering pipeline 202. Thus, other test functions of the rest of the pipeline 230 that could delete the pixel may be disabled. Particularly, in the case of promotable pixels, there is no need to apply pixel texture, interpolated alpha, or to comprehend its pixel color—in other words, no other attributes are part of the Z pass/Z fail decision; the promotable pixel is never "killed" from color keying, alpha tests, or similar functions. These are typically opaque and fixed translucency features.

Accordingly, the IZ function 200 deterministically knows for promotable pixels that no other tests for the evaluation of texture or alpha for the promotable pixel needs to be performed. If a promotable pixel passes the Z-test of the Z-buffering test logic 214 at the front of the rendering pipeline 202 and enters the rest of rendering pipeline 230, the promotable pixel will make it all the way to the end of the rendering pipeline 202 and will ultimately update the Z-buffer 218 and the color buffer 231. On the other hand, if the promotable pixel fails the Z-test this is not an issue as the pixel is deleted and the Z-buffer will not need to be updated anyway.

Therefore, the IZ function 200 deterministically knows what Z-value would be written to the Z-buffer 218 if the promotable pixel were to be processed by the rest of rendering pipeline 230 and the Z-test and the writing of the Z-value were to be performed at the end of the rest of the rendering pipeline 230. Thus, because the IZ function 200 deterministically know that this condition exists, the IZ function 200 can write that Z-value to the Z-buffer for the promotable pixel at the beginning of the pipeline instead of at the end of the pipeline. The act of writing the Z-value to the Z-buffer 218 utilizing the Z-test logic 214 at the beginning of the rendering pipeline 202, versus the end of the rest of the pipeline 230, results in the pixel being "promoted" (i.e. written to the Z-buffer). Thus, a promoted pixel is a pixel whose Z-value is updated to the Z-buffer 218 of the render cache 218 by the IZ function 200 in advance of processing the pixel down in the rest of the rendering pipeline 230.

If a promotable pixel passes the Z-test, it is promoted and sent to the pixel mask logic 222 and onto the rest of the rendering pipeline 230 for rendering. Alternatively, if the pixel fails the Z-test, it is deleted.

Also, it should be noted that in other embodiments, in addition to or in lieu of the Z-test, a stencil test utilizing a stencil buffer 232 may used. Generally, a stencil test (which can be any number of programmable functions) is used to make a render/no render decision on pixel-by-pixel basis.

On the other hand, the IZ function 200 cannot promote an "unpromotable" pixel because the IZ function 200 does not know if that pixel will in fact survive later processing in the rest of the rendering pipeline 230. Hence, an unpromotable pixel is not promoted (i.e. it is unpromoted—it cannot be written to the Z-buffer).

Particularly, an unpromotable pixel is one whose Z-buffer 218 (and/or stencil buffer 232) cannot be resolved. For example, for an unpromotable pixel there may be a need to apply pixel texture, interpolated alpha, or to comprehend its pixel color—in other words, these other attributes are part of the pass/fail decision of the Z-test since the unpromotable pixel can be "killed" from color keying, alpha tests, or similar functions later in the rest of the rendering pipeline 230. The shorthand for this type of feature is herein called "cheese". Also, the unpromotable pixel may be perturbated by a texture or other pixel attribute.

The IZ function 200 utilizing the Z-buffer test logic 214 at the front of the rendering pipeline 202 can determine if an unpromotable pixel fails the Z-test and discard the pixel, a usual. But even if the unpromotable pixel passes the Z-test, the IZ function 200 cannot write the Z-value to the Z-buffer because the IZ function 200 does not determinatively know whether the unpromotable pixel will survive through the rest of the pipeline 230. In this instance, the Z-test may need to be performed near the end of the pipeline, as usual. Therefore, the Z-test logic 214 at the front of the rendering implementing the IZ function 200 can determine if an unpromotable pixel fails the Z-test, and the pixel will be deleted, but the IZ function 200 cannot determinatively determine if the unpromotable pixel passes the Z-test. Thus, even when a unpromotable pixel passes the Z-test, it is not promoted (i.e. it is unpromoted—not written to the Z-buffer 218) and is just issued to the rest of the pipeline 230 for processing.

Thus, an unpromoted pixel is a pixel whose Z-value is not updated to the Z-buffer 218 in the render cache 216 by the IZ function 200 at the front of the rendering pipeline in advance of processing the pixel further down the rendering pipeline 202. Accordingly, for unpromotable pixels the Z-buffering test cannot be determinatively accomplished and the "unpromotable" pixel is not promoted (i.e. it is unpromoted—not written to the Z-buffer 218) and is sent on to the rest of rendering pipeline 202 for processing.

The scoreboard memory 224 having pixel status array 225 marks pixels that are unpromoted in the pipeline. This is important because if there is an unpromoted pixel in the pipeline then the IZ function 200 does not know for sure what the present value in the Z-buffer 218 is—i.e. the IZ function 200 knows what the value in the Z-buffer "was" but it is not sure what it will be. As will be discussed, when the pixel status array 225 of scoreboard 224 is zero for a pixel, then the IZ function 200 knows what the pixel is promotable.

Thus, the pixel status array 225 of the scoreboard memory 224 is utilized to track and handle these special "unpromoted" pixel cases, as will be discussed in detail later. One particular example of a class of unpromotable pixels is what is termed "cheese" wherein a pixel has a texture (e.g. holes, transparent textures, translucent textures, etc.) associated with it.

Using embodiments of the present invention for the improved Z-buffering (IZ) process or function 200, wherein Z-buffering is performed at the front of the pipeline, the number of pixels issued to the remaining portion of the rendering pipeline 202 for rendering are substantially decreased because pixels are deleted as early as possible in the rendering pipeline. It should be noted that this rendering pipeline 202 architecture works particularly well with chunking architectures wherein graphics are rendered in "bins" or "zones", i.e., sections of the overall "frame" or total screen. Moreover, the memory of the render cache 216 (including the Z-buffer 218) is utilized much more efficiently than in the prior art, wherein Z-buffering is only performed at the very end of the rendering pipeline.

Figure 4:
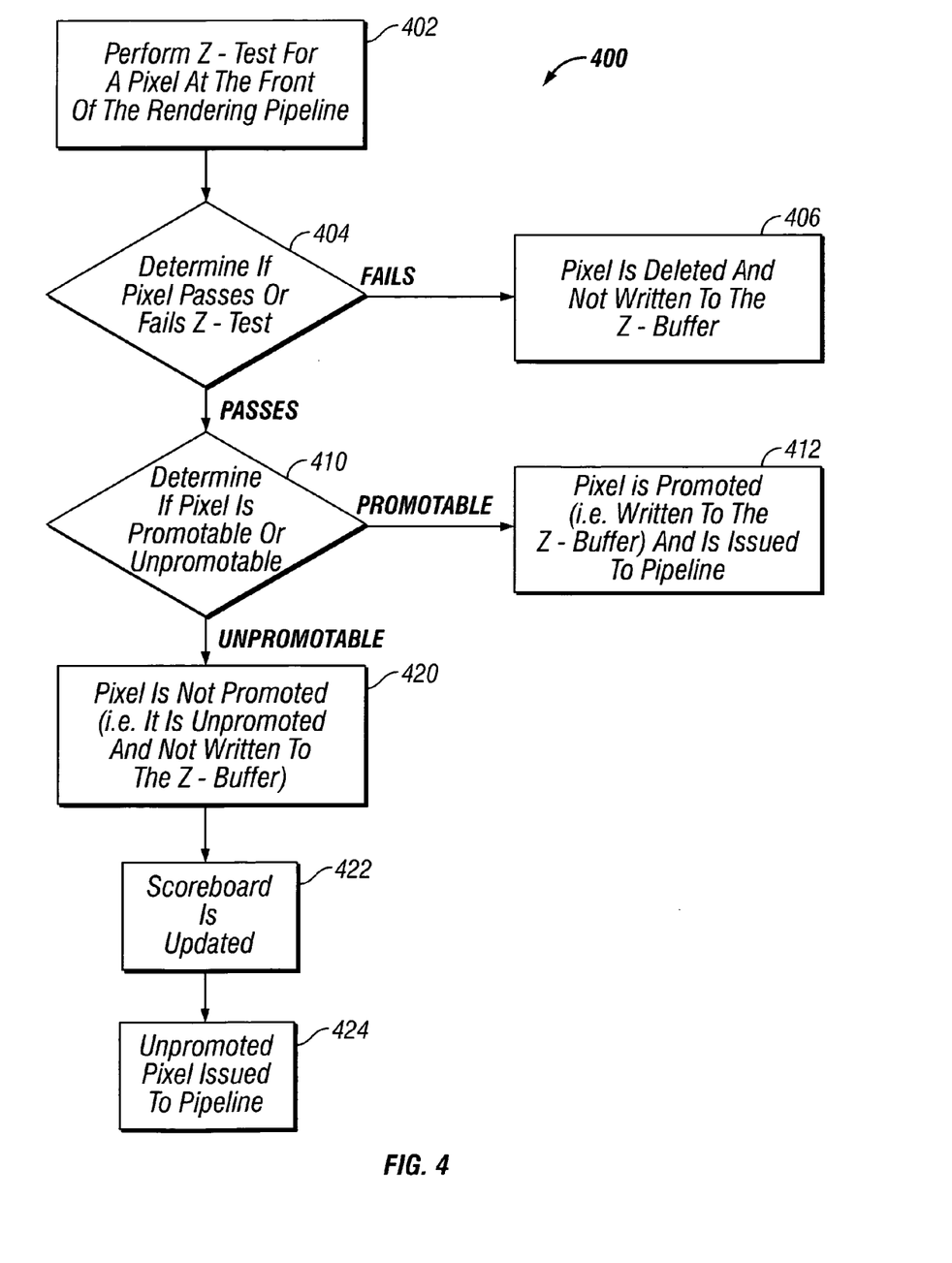
FIG. 4 is a flowchart illustrating a simplified example of the Z-test of the IZ process, according to one embodiment of the invention.

With reference now to FIG. 4, FIG. 4 is a flowchart illustrating a simplified example of the Z-test 400 of the IZ process 200, according to one embodiment of the invention. Particularly, FIG. 4 illustrates the use of "promotable" and "unpromotable" pixels, as previously discussed, in the Z-test 400 of the IZ process 200.

At block 402, the Z-test is performed for a pixel of the current polygon (e.g. a triangle) of the bin currently being processed. Next, at block 404, the IZ process 200 determines if the pixel passes or fails the Z-test. If the pixel fails the Z-test, the pixel is is deleted and Z-buffer is not updated (i.e. the Z-value for the pixel is not written to the Z-buffer).

On the other hand, if the pixel passes the Z-test, it is next determined at block 410 whether the pixel is promotable or unpromotable. As previously discussed, a promotable pixel is a pixel that is part of a polygon (e.g. a triangle) that the IZ process 200 deterministically knows will survive through the rest of the pipeline 230 if it passes the Z-test. If the pixel is determined to be promotable, then at block 412 the pixel is promoted meaning that the Z-buffer is updated (i.e. the Z-value for the pixel is written to the Z-buffer), and further, the promoted pixel is issued to the rendering pipeline for rendering.

However, if the pixel is determined to be unpromotable, the IZ process 200 proceeds to block 420. As previously described in unpromotable pixel is one whose Z-buffer 218 cannot be resolved because the IZ process 200 does not determinatively know whether the unpromotable pixel will survive through the rest of the pipeline 230. At block 420, the pixel (even though it passed the Z-test) is not promoted. The pixel is defined as being unpromoted and the Z-buffer is not updated (i.e. the Z-value for the unpromoted pixel is not written to the Z-buffer). Instead, at block 422 a scoreboard memory is updated and the unpromoted pixel is issued to the rest of the pipeline 230 for processing (block 424). As will be discussed in more detail later, the scoreboard memory 224 has a pixel status array 225 for marking pixels that are unpromoted in the pipeline, which is important because if there is an unpromoted pixel in the pipeline then the IZ function 200 does not know for sure what the present value in the Z-buffer 218 is for the pixel i.e. the IZ function 200 knows what the value in the Z-buffer "was" but it is not sure what it will be.

The scoreboard 224 and pixel status array 225 will now be discussed in more detail and further bridging conditions will be discussed in more detail after the discussion of the scoreboard.

Fundamentally, if all of the pixels were always promotable and all of the pixels were always promoted then this would be the equivalent of moving the Z-buffer 218 physically to the front of the pipeline. By promoting the Z-values any subsequent read from the Z-buffer 218 by the IZ function 200 is time coherent with the prior writes by the IZ function 200 to the Z-buffer. However, any time the IZ function 200 cannot promote the Z-values (e.g. for unpromotable pixels) then there is a discontinuity in the time domain; and the Z-buffer 218 will not have the sequentially "correct" value until the rendering pipeline 202 finally writes the Z-value to the Z-buffer at the end of the pipeline. This occurs many clocks later (in pipeline time) than if the IZ function 200 had promoted the Z-value at the front of the pipeline. This means that any time the IZ function 200 cannot promote a Z-value for a given pixel, any subsequent read to the Z-buffer 218 for that pixel by the IZ function is not the correct value, until the unpromoted pixel flushes through the rendering pipeline. In order to keep track of the status of the unpromoted pixels, a scoreboard memory 224 having a pixel status array 225 for every pixel in the pipeline is utilized.

For all cases where Z cannot be promoted, because the feature itself is unpromotable (e.g. cheese—an associated texture that includes holes, transparent textures, translucent textures, etc.), then the IZ function 200 when it hits such a pixel, that was in flight before and not promoted, waits for that pixel to flush through the rendering pipeline 202. In addition, as will be discussed in more detail, the IZ function 200 also waits for a bridge to retire—waiting for the pipeline to flush between bins. This makes the IZ function fully coherent to the back of the pipeline—making it "appear" as if the Z-buffer is always in the IZ time domain (pipeline time). However, in order to recover the performance loss that occurs due to this stalling, the IZ function 200 continues pumping pixels into the rendering pipeline while algorithmically covering the ambiguities induced by this method.

In order to keep track of the status of the unpromoted pixels, a scoreboard memory 224 having a pixel status array 225 for every pixel in the pipeline is utilized. In its most basic embodiment, the scoreboard holds a pixel status array 225 for every pixel in the rendering pipeline, wherein the pixel status array 225 designates whether a pixel is promotable or unpromotable. For example, when the pixel status array 225 is set to zero, the pixel is promotable, and when the pixel status array 225 is not set to zero (i.e. another value), the pixel is unpromotable.

For example, the pixel status array have the follows designations: there are no unpromoted pixels in the rendering pipeline presently for this array entry (i.e. the pixel is promotable, e.g. the pixel status array is set to 0); there is one unpromoted pixel presently in the rendering pipeline for this array entry; there are two unpromoted pixels presently in the rendering pipeline for this array entry; there are three unpromoted pixels presently in the rendering pipeline for this array entry, etc.

Further, embodiments of the invention related to the IZ function 200 preferably accounting for bridging conditions as will now be discussed. On each bin there is a startup condition where the pixels presently in the rendering pipeline 202 are part of the previous bin (i.e. chunk). Rather than wait for the rendering pipeline to flush—a large overhead—it is desirable to start the processing of the next bin before the rendering pipeline is emptied. Therefore, for a period of time there are pixels in the pipeline for two (or more) consecutive bins, or in the case where the previous bin is the last bin of the frame, the bins are of different frames. Therefore, a signal is generated that defines that at least some of the pixels in the pipeline and render cache are not commonly "owned" by the same bin in the IZ function 200. Also, a mechanism is provided to allow two bins to be in progress.

The reasons that the bridging conditions may need to be known are:
1) The IZ function 200 sets status in a pixel status array 225 of the scoreboard 225 which allows the IZ function 200 to know when unpromoted pixels are still being processed in the rendering pipeline 202. This field is decremented when the color calculator 231 retires the same unpromoted pixel to the render cache 216. It should be noted that color calculators to determine the color of a pixel are well known in the art. During the bridging case, feedback is blocked from the color calculator 231 because the IZ function 200 is not fully coherent with the data in the rendering pipeline during this time. If the feedback was not blocked, the pixel status array 225 would be corrupted from the previous bin's pixels draining in the pipeline.

2) As previously discussed, the IZ function 200 is to read the Z-values from the render cache 216. However, during the bridge the Z-values in the render cache are not coherent with the IZ function 200 because the IZ function 200 may be operating on different bins. This could cause the presently processed bin to throw away the wrong pixels and generate erroneous results. Therefore, these reads are blocked.

3) During the bridge, the IZ function 200 is not allowed to update the render cache 216 since the two functions are on different bins. Not protecting this case would corrupt the previous bin still in progress (draining) in the rendering pipeline 202, leading to erroneous results. Since the bridging function blocks the IZ function from writing to the Z-buffer 218 of the render cache 216, all of the pixels entering the pipeline during the bridge are forced to be unpromoted.

To generate the bridge condition, in one emodiment, a bridge counter is used to track the first span of a bin all of the way through the rendering pipeline 202. For example, at the start of a bin, a single bit of the bridge counter is set. The IZ function 200 takes the spans generated by the polygons (e.g. triangles) and performs the Z-test. After the first non-null span after the Z-test (not all zero pixel mask) of the bin, the span is dispatched to the rendering pipeline, then that span is flagged as the first span of the bin and the bridge counter is incremented. The reason for waiting until the IZ function outputs the first span for the bin before it increments the bridge counter is that if no pixels are ever output by the IZ function there would be no way to decrement it later. When the first pixel of this first span makes its way out of the render pipeline the bridge counter is decremented. When the bridge counter is equal to zero the rendering pipeline is fully coherent (the IZ function is working on the same bin as the back of the pipeline) and normal processing commences.

Embodiments of the invention related to promotable and unpromotable cases will now be discussed in even more detail. Typically, a promotable feature is promoted, however, the cases that cause a promotable feature to not be promoted include:

1) The bridge is active (i.e. the bridge counter is non-zero): during the bridge if the IZ function 200 puts pixels into the rendering pipeline 202 (e.g. to minimize dead cycles) the Z-buffer 218 cannot be updated, even if the feature is promotable, since there is no place to put the data.

2) There is already an unpromoted pixel in progress: because the IZ function 200 is designed to force the renderer to automatically pass the Z-test whenever the Z-buffer 218 is coherent with the IZ function 200 there is a special case that precludes the IZ function from over-riding the renderer if the render cache 216 is not coherent. Therefore, even if a feature is promotable and the bridge is inactive, if for a given pixel there already exists a unpromoted feature in the pipeline, the promotable feature will not be promoted for that pixel.

As previously discussed, the scoreboard 224 includes the pixel status array 225 which is used to keep track of unpromoted pixels in flight in the rendering pipeline 202. At the start of each bin the pixel status array 225 is cleared. As each pixel is processed by the IZ function 200 the pixel status array is examined. If that pixel is promoted (i.e. it is promotable and the pixel status array is equal to zero), for that pixel the pixel status array 225 is left unaltered such that subsequently the renderer will force the pixel to pass causing a color write to the color cache assuming color writing is enabled.

On the other hand, if the pixel is unpromoted (i.e. the pixel status array 225 of the scoreboard 224 is non-zero and/or it is an un-promotable feature such as "cheese"), for that pixel, the pixel status array 225 is incremented by the IZ function 200 and the Z-value for that pixel is not written into the Z cache.

Lastly, in summary, the Z-buffer 218 cache pixel entries can be written to (i.e. the pixel promoted) by the IZ function's 200 computed source values under all but the following conditions:

1) If the Z-test fails.
2) If writing to the Z-buffer 218 is disabled.
3) If the bridge counter is non-zero (i.e. the render cache 216 is not coherent with the IZ function 200).
4) If the pixel status array 225 is non-zero.
5) The pixel is unpromotable.

Those skilled in the art will recognize that although aspects of the invention and various functional components have been described in particular embodiments, it should be appreciated these aspects and functionalities can be implemented in hardware, software, firmware, middleware or a combination thereof.

When implemented in software, firmware, or middleware, the elements in the embodiments of the present invention are the instructions/code segments to perform the necessary tasks. The instructions which when read and executed by a machine or processor, cause the machine processor to perform the operations necessary to implement and/or use embodiments of the invention. As illustrative examples, the "machine" or "processor" may include a graphics processor, a rendering engine, a digital signal processor, a microcontroller, a state machine, or even a central processing unit having any type of architecture, such as complex instruction set computers (CISC), reduced instruction set computers (RISC), very long instruction worked (VLIW), or hybrid architecture. These instructions can be stored in a machine-readable medium (e.g. a processor readable medium or a computer program product) or transmitted by a computer data signal embodied in a carrier wave, or a signal modulated by a carrier, over a transmission medium of communication link. The machine-readable medium may include any medium that can store or transfer information in a form readable and executable by a machine. Examples of the machine readable medium include an electronic circuit, a semiconductor memory device, a ROM, a flash memory, an erasable programmable ROM (EPROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via networks such as the Internet, Intranet, etc.

While embodiments of the invention have been described with reference to illustrative embodiments, these descriptions are not intended to be construed in a limiting sense.

Various modifications of the illustrative embodiments, as well as other embodiments of the invention, which are apparent to persons skilled in the art to which embodiments of the invention pertain, are deemed to lie within the spirit and scope of the invention.

What is claimed is:

1. An apparatus comprising:

Z-buffering test logic located at a front portion of a rendering pipeline to perform a Z-test on a pixel and to determine whether the pixel passes or fails the Z-test;

a render cache including a Z-buffer coupled to the Z-buffering test logic such that the Z-test for the pixel is performable and the Z-buffer is updateable at the front portion of the rendering pipeline, wherein if the pixel passes the Z-test, the Z-buffering test logic further determines if the pixel is promotable or unpromotable, and if the pixel is determined to be unpromotable, the Z-buffer is not updated and the unpromoted pixel is issued to the rest of pipeline; and a scoreboard memory coupled to the rest of the pipeline and the Z-buffering test logic at the front of the pipeline, the scoreboard memory including a pixel status array for every pixel in the pipeline to designate whether a pixel is promotable or unpromoteable, the scoreboard memory to identify and track unpromoted pixels that are issued to the rest of the pipeline;

wherein pixel status from the rest of the pipeline is coupled through the scoreboard memory including the pixel status array to the Z-buffering test logic at the front portion of the rendering pipeline and the Z-buffering test logic accounts for bridging conditions including forcing pixels to remain unpromoted such that pipeline coherency is ensured.

2. The apparatus of claim 1, wherein if a pixel fails the Z-test, the pixel is deleted and the Z-buffer is not updated.

3. The apparatus of claim 1, wherein if the pixel is determined to be promotable, the promotable pixel is promoted.

4. The apparatus of claim 3, wherein promoting the promotable pixel comprises the Z-buffer being updated and the promoted pixel being issued to the rest of pipeline.

5. The apparatus of claim 1, wherein if a pixel is determined to be unpromotable, the unpromotable pixel is not promoted.

6. The apparatus of claim 1, wherein a pixel is unpromotable due to the pixel being identified as a cheese pixel.

7. The apparatus of claim 6, wherein a cheese pixel is a pixel having a texture including at least one of a transparent texture or a translucent texture.

8. A method comprising:

performing a Z-test on a pixel at a front portion of a rendering pipeline;

determining whether the pixel passes or fails the Z-test at the front portion of the rendering pipeline; and updating a Z-buffer with the results of the Z-test at the front portion of the rendering pipeline;

wherein if the pixel passes the Z-test, determining if the pixel is promotable or unpromotable, and if the pixel is determined to be unpromotable, issuing the unpromoted pixel to the rest of pipeline and not updating the Z-buffer;

identifying the unpromoted pixel that is issued to the rest of the pipeline; and tracking the unpromoted pixel that is issued to the rest of the pipeline utilizing a scoreboard memory, the scoreboard memory including a pixel status array for every pixel in the pipeline to designate whether a pixel is promotable or unpromoteable; and wherein pixel status from the rest of the pipeline is coupled through the scoreboard memory including the pixel status array to the front portion of the rendering pipeline where bridging conditions are accounted for including forcing pixels to remain unpromoted such that pipeline coherency is ensured.

9. The method of claim 8, wherein if a pixel fails the Z-test, further comprising deleting the pixel and not updating the Z-buffer.

10. The method of claim 8, wherein if the pixel is determined to be promotable, further comprising promoting the promotable pixel.

11. The method of claim 10, wherein promoting the promotable pixel further comprises updating the Z-buffer and issuing the promoted pixel to the rest of pipeline.

12. The method of claim 8, wherein if a pixel is determined to be unpromotable, further comprising not promoting the unpromotable pixel.

13. The method of claim 8, wherein a pixel is unpromotable due to the pixel being identified as a cheese pixel.

14. The method of claim 13, wherein a cheese pixel is a pixel having a texture including at least one of a transparent texture or a translucent texture.

15. A system comprising:

a graphics processor to render graphics;

a rendering engine included in the graphics processor having a rendering pipeline;

Z-buffering test logic located at a front portion of the rendering pipeline to perform a Z-test on a pixel and to determine whether the pixel passes or fails the Z-test; and a render cache including a Z-buffer coupled to the Z-buffering test logic such that the Z-test for the pixel is performable and the Z-buffer is updateable at the front portion of the rendering pipeline, wherein if the pixel passes the Z-test, the Z-buffering test logic further determines if the pixel is promotable or unpromotable, and if the pixel is determined to be unpromotable, the Z-buffer is not updated and the unpromoted pixel is issued to the rest of pipeline; and a scoreboard memory coupled to the rest of the pipeline and the Z-buffering test logic at the front of the pipeline, the scoreboard memory including a pixel status array for every pixel in the pipeline to designate whether a pixel is promotable or unpromoteable, the scoreboard memory to identify and track unpromoted pixels that are issued to the rest of the pipeline;

wherein pixel status from the rest of the pipeline is coupled through the scoreboard memory including the pixel status array to the Z-buffering test logic at the front portion of the rendering pipeline and the Z-buffering test logic accounts for bridging conditions including forcing pixels to remain unpromoted such that pipeline coherency is ensured.

16. The system of claim 15, wherein if a pixel fails the Z-test, the pixel is deleted and the Z-buffer is not updated.

17. The system of claim 15, wherein if the pixel is determined to be promotable, the promotable pixel is promoted.

18. The system of claim 17, wherein promoting the promotable pixel comprises the Z-buffer being updated and the promoted pixel being issued to the rest of pipeline.

19. The system of claim 15, wherein if a pixel is determined to be unpromotable, the unpromotable pixel is not promoted.

20. The system of claim 15, wherein a pixel is unpromotable due to the pixel being identified as a cheese pixel.

21. The system of claim 20, wherein a cheese pixel is a pixel having a texture including at least one of a transparent texture or a translucent texture.

22. A machine-readable storage medium of a storage device having stored thereon instructions for use in graphics rendering, which when executed by a machine, cause the machine to perform the following operations comprising:
performing a Z-test on a pixel at a front portion of a rendering pipeline;
determining whether the pixel passes or fails the Z-test at the front portion of the rendering pipeline; and
updating a Z-buffer with the results of the Z-test at the front portion of the rendering pipeline;
wherein if the pixel passes the Z-test,
determining if the pixel is promotable or unpromotable, and if the pixel is determined to be unpromotable,
issuing the unpromoted pixel to the rest of pipeline and not updating the Z-buffer;
identifying the unpromoted pixel that is issued to the rest of the pipeline; and
tracking the unpromoted pixel that is issued to the rest of the pipeline utilizing a scoreboard memory, the scoreboard memory including a pixel status array for every pixel in the pipeline to designate whether a pixel is promotable or unpromoteable; and
wherein pixel status from the rest of the pipeline is coupled through the scoreboard memory including the pixel status array to the front portion of the rendering pipeline where bridging conditions are accounted for including forcing pixels to remain unpromot&d such that pipeline coherency is ensured.

23. The machine-readable storage medium of claim 22, wherein if a pixel fails the Z-test, further comprising deleting the pixel and not updating the Z-buffer.

24. The machine-readable storage medium of claim 22, wherein if the pixel is determined to be promotable, further comprising promoting the promotable pixel.

25. The machine-readable storage medium of claim 24, wherein promoting the promotable pixel further comprises updating the Z-buffer and issuing the promoted pixel to the rest of pipeline.

26. The machine-readable storage medium of claim 22, wherein if a pixel is determined to be unpromotable, further comprising not promoting the unpromotable pixel.

27. The machine-readable storage medium of claim 22, wherein a pixel is unpromotable due to the pixel being identified as a cheese pixel.

28. The machine-readable storage medium of claim 27, wherein a cheese pixel is a pixel having a texture including at least one of a transparent texture or a translucent texture.

* * * * *

UNITED STATES PATENT AND TRADEMARK OFFICE
CERTIFICATE OF CORRECTION

| | |
|---|---|
| PATENT NO. | : 7,268,779 B2 |
| APPLICATION NO. | : 10/329202 |
| DATED | : September 11, 2007 |
| INVENTOR(S) | : Piazza et al. |

Page 1 of 1

It is certified that error appears in the above-identified patent and that said Letters Patent is hereby corrected as shown below:

In column 10, at line 46, delete "worked" and insert --word--.

In column 14, at line 5, delete "unpromot&d" and insert --unpromoted--.

Signed and Sealed this

Fifteenth Day of April, 2008

JON W. DUDAS
*Director of the United States Patent and Trademark Office*